C. J. KINDEL.
SETTEE BED.
APPLICATION FILED JAN. 2, 1912.
1,065,373.
Patented June 24, 1913.
6 SHEETS—SHEET 4.
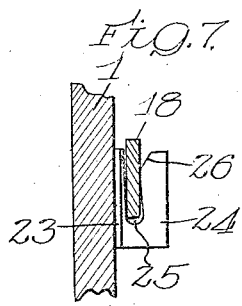
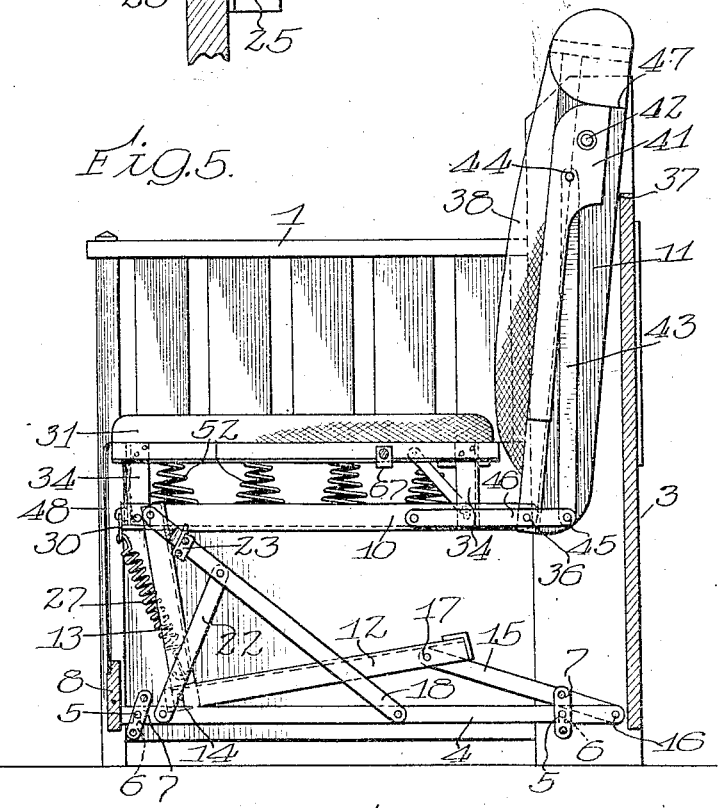
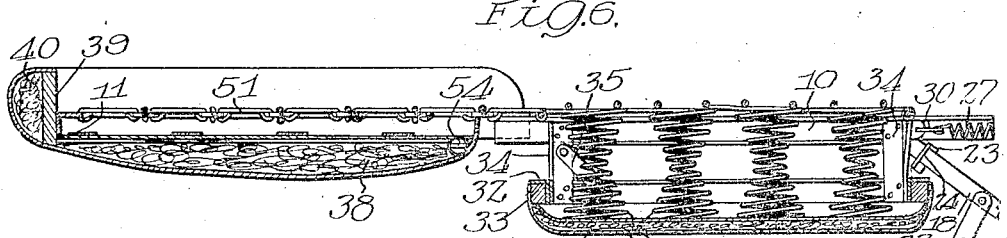

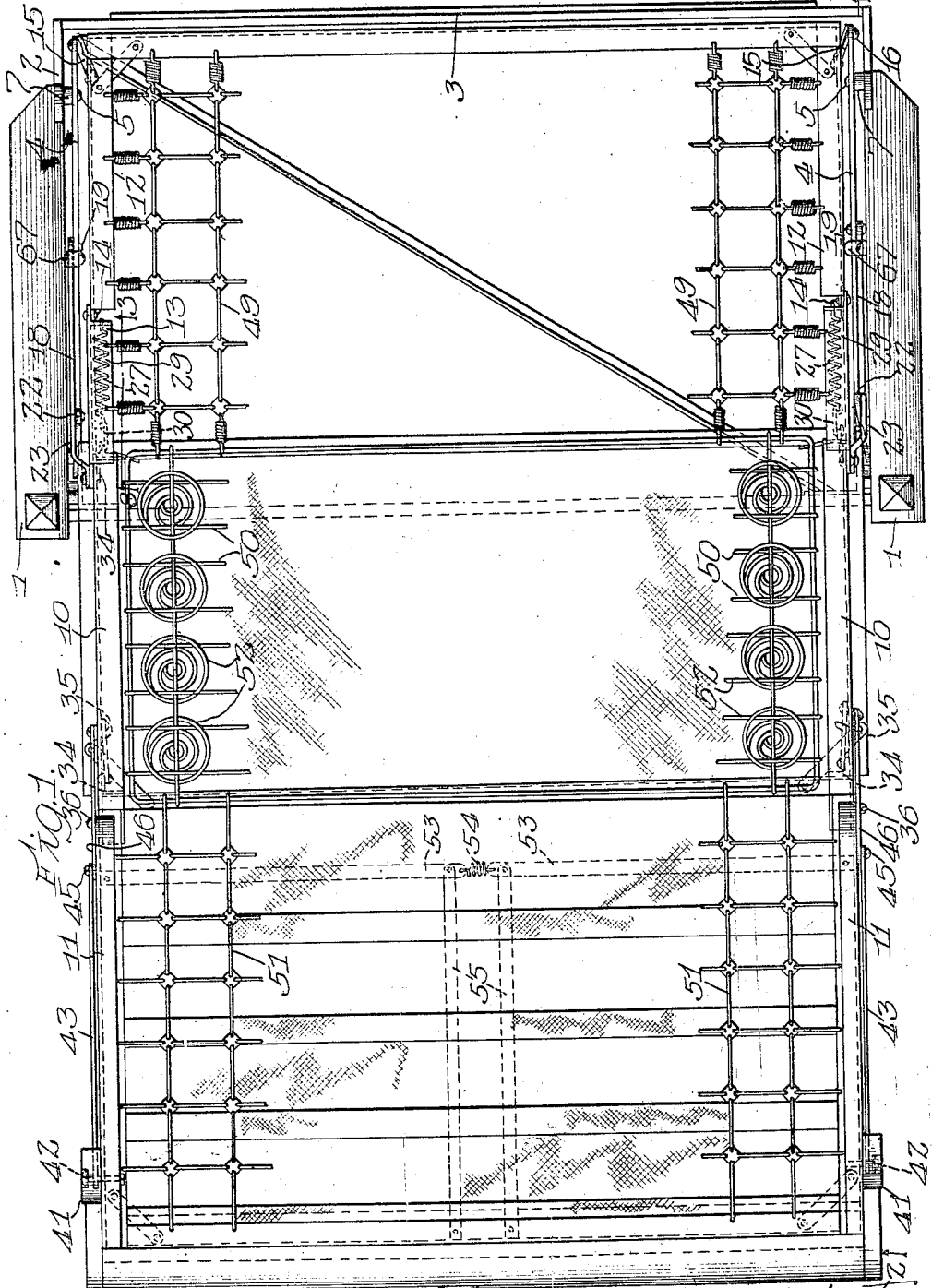

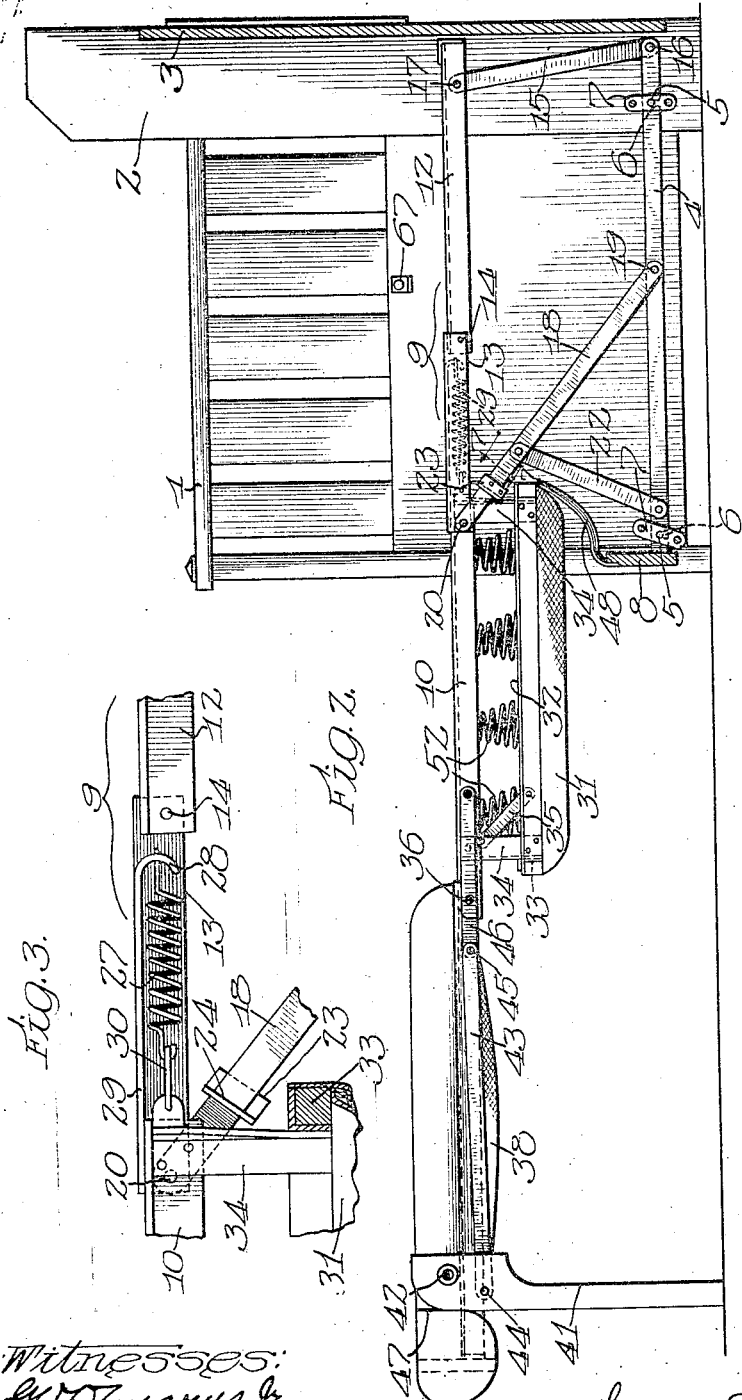

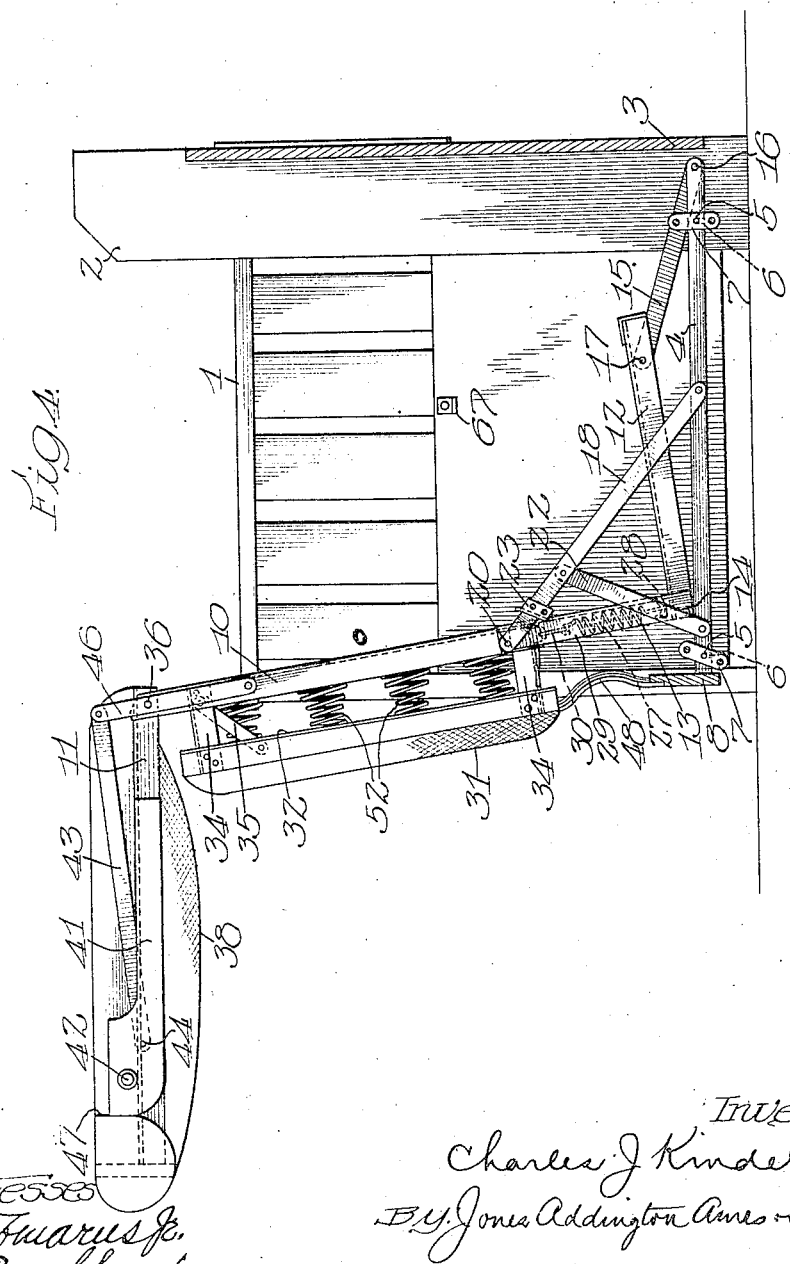

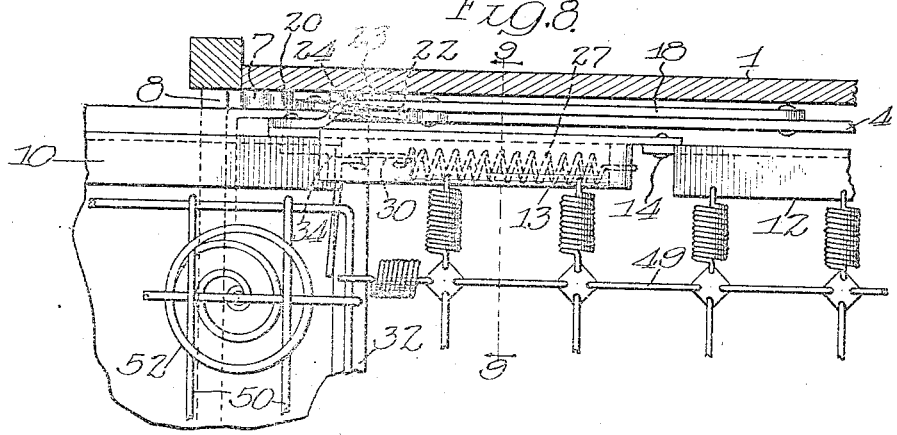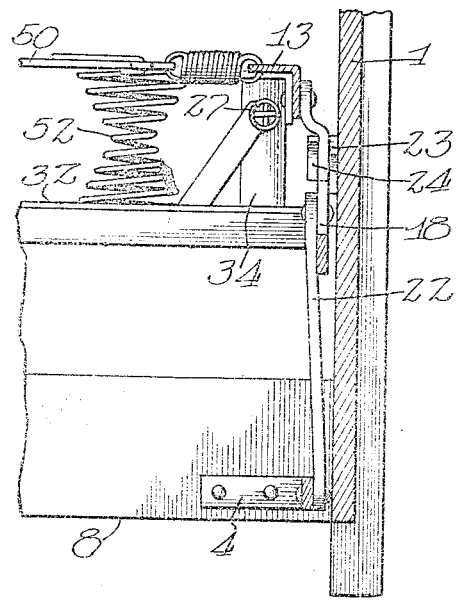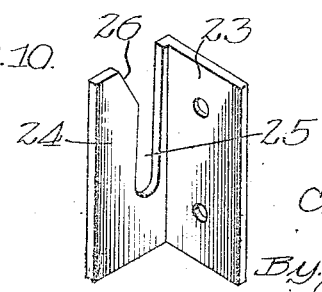

C. J. KINDEL.
SETTEE BED.
APPLICATION FILED JAN. 2, 1912.
1,065,373.
Patented June 24, 1913.
6 SHEETS—SHEET 6.
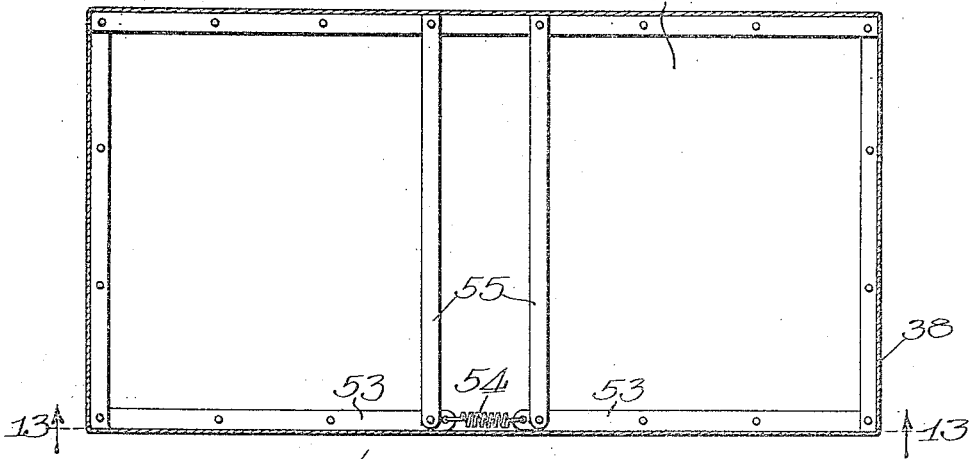
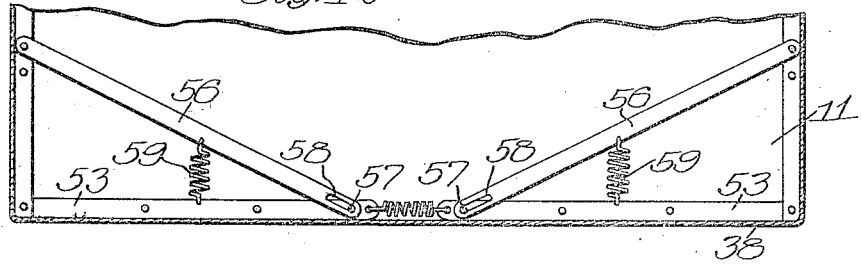
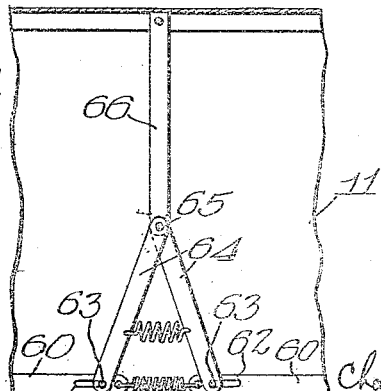
Witnesses:
G. W. Tomarus Jr.
R. Burkhardt
Inventor:
Charles J. Kindel
by Jones, Addington, Ames & Seibold
Attys.

UNITED STATES PATENT OFFICE.

CHARLES J. KINDEL, OF WILMETTE, ILLINOIS.

SETTEE-BED.

1,065,372.

Specification of Letters Patent.

Patented June 24, 1913.

Application filed January 2, 1912. Serial No. 668,945.

*To all whom it may concern:*

Be it known that I, CHARLES J. KINDEL, a citizen of the United States, residing at Wilmette, in the county of Cook and State of Illinois, have invented new and useful Improvements in Settee-Beds, of which the following is a full, clear, concise, and exact description, reference being had to the accompanying drawing, forming a part of this specification.

This invention relates in general to furniture of the convertible type, and more particularly to improvements in sofas, or divans as they are sometimes called, which are adapted to be readily unfolded or opened to form a bed or cot, and to be as readily folded, when not in use, into a minimum space.

A further object is to provide an improved portable device of this class which is of sectional structure and which sections are so connected and arranged that when closed the intermediate section will fold over one of the end sections to form a seat while the other end section will assume an upright position with respect to the seat to form the back of the sofa; all of the sections assuming, when opened, a substantially horizontal plane with each other.

A further object is to provide an improved device of this class having legs for supporting the outermost section and means whereby the legs will be automatically folded and unfolded by the closing and opening of the sections; the legs when folded forming a portion of the framework of the structure.

A further object is to provide an improved device of this class having means for assisting in opening and closing the structure thereby relieving the operator of a portion of the weight of the sections.

These and such other objects as may hereinafter appear are attained by my device, an embodiment of which is illustrated in the accompanying drawings, in which—

Figure 1 is a top plan view of my device with parts omitted; Fig. 2 is a sectional view on line 2—2 of Fig. 1; Fig. 3 is a detail view of the connecting means between two of the sections; Fig. 4 is a view similar to Fig. 2 showing the parts in a partially closed position; Fig. 5 is a view similar to Fig. 4 showing the parts in a closed position; Fig. 6 is an enlarged detail sectional view of the intermediate and outermost sections, showing the sections in open position; Fig. 7 is a detail sectional view on line 7—7 of Fig. 2; Fig. 8 is an enlarged detail view partly in plan and partly in section showing the connection illustrated in Fig. 3; Fig. 9 is a detail sectional view on line 9—9 of Fig. 8; Fig. 10 is a perspective view of a detail; Fig. 11 is a plan view, partly in section, of the reinforcing means and yielding support for the edge of one of the sections; Fig. 12 is a detail view of another form of reinforcing means; Fig. 13 is a view, taken on line 13—13 of Fig. 11, showing in dotted lines the manner in which the reinforcing means yields; and Fig. 14 is a detail view of still another form of reinforcing means.

Referring to the drawings, 1 designates the sides of the main or stationary frame, with relation to which the remaining structure is foldable, and constitutes the ends or arms of the sofa. Uprights 2 are arranged at one end of the sides 1 and are connected by a cross member 3. The frame thus formed may be of any suitable size and configuration, and removably arranged therein, adjacent the bottom thereof, are bars or rods 4 which constitute a portion of the immediate support for the folding structure. These bars are supported in any suitable manner, preferably by means of pins or projections 5 supported by the respective sides 1 over which notched portions 6, in the bars, engage, and keepers or clips 7 prevent accidental disengagement of the parts. The bars 4 are of a length slightly less than the width of the frame and the forward ends thereof terminate adjacent and in the rear of a foot-board 8 arranged at the front and adjacent to the base of the main framework.

The folding structure, in the present form of the invention, comprises three sections designated generally by the numerals 9—10—11. The section 9 is disposed within the stationary frame to move therein and is itself formed in two parts designated by the references 12—13, the adjacent ends of which are pivotally connected as at 14. The section 9 is supported on the bars 4 by means of links 15 pivotally connected at their lower ends at 16 to the respective bars, and pivotally connected at their upper ends to the bar 12 as at 17. Diagonal supporting members or links 18 are connected at one end to the bars 4 as at 19 at points intermediate the ends of the bars, and extend forwardly toward the front of the section 9, and are pivotally connected thereto as at 20 at points in advance of the pivots 14 between the parts 12—13. Brace bars 22 are connected with the bars 4 and the members 18 for holding the latter in an upright position. An additional support 23 may be provided for the members 18, shown more clearly in Figs. 7 and 10, and comprises a body portion which is secured preferably to the ends 1 of the frame, and a laterally projecting flange 24 having an upwardly opening slot 25, which latter tapers from the open end toward the bottom of the slot, and into which slot the respective members 18 fit. By the use of the tapering slot there will be a wedging or pinching action upon the members 18 thereby firmly and securely holding them in place. In order to more readily direct the members 18 into the slots a portion of one wall of the slots may be cut away or beveled as shown at 26.

The intermediate seat or section of the folding structure is pivotally connected with the sections 9 at 20. The pivots 20—14 are spaced some distance from each other, and a spring member 27 is disposed between each pair of pivots. One end of each of the springs is connected with the part 13, preferably to an extension 28 formed on a flange 29 (which serves as a cover for the spring) the other end of the spring is secured to the section 10 in any suitable manner such as by means of a link 30, which link operates as a protection to the spring and will yield when the sections are folded and unfolded to prevent deterioration of the end of the spring and thereby obviate the danger of breaking the springs at that point. These springs operate to assist the operator in opening and closing the sections as they normally exert their tension in a direction to open the sections, but the tension is not strong enough to entirely overcome the weight of the sections when the latter are closed as shown more clearly in Fig. 5.

The seat proper 31 is under the section 10 and may be of any suitable construction, but preferably comprises a frame 32, of angle-iron construction, with the angle opening outwardly for the reception of a filler 33 (see Fig. 6) such as wood or the like to which the upholstering may be secured. The frame 32 is supported on the section 10 by suitable uprights 34 reinforced by suitable braces 35. The section 10, when the parts are closed, will assume the position shown in Fig. 5, that is, so that the section and the seat 31 will be disposed within the main frame 1. The sections 9 and 10 may be formed in any suitable manner, preferably in the form of frames braced and reinforced at the necessary points and in any suitable manner, and are constructed preferably of angle-iron. The foot or back section 11 is also constructed of any suitable material, but the sides thereof are preferably formed of the same material as the ends of the main frame, for obvious reasons. This section 11 is pivotally connected with the section 10 as at 36 and constitutes the outermost section when open and the back of the structure when the parts are closed (as shown in Fig. 5) and is adapted to rest adjacent the edge 37 of the connecting member 3, between the uprights 2 and the member 3 terminating short of the upper ends of the uprights as shown, the corner or edge thereby serving as a stop for the back section 11 and a support therefor to protect the latter against strain when a pressure is applied thereon. The section 11 is provided with upholstering 38 on one face beneath the section when the sections are open to form a cot or bed, as shown in Figs. 2 and 6, and form the back of the seat when the parts are closed. A ledge or flange 39 (see Fig. 6) projects laterally from the free edge of the section 11, and upholstering 40 is provided thereon, forming the upper edge of the back when the parts are closed.

The free edge of the section 11 may be supported, when unfolded, in any suitable manner, preferably by means of legs 41 which are pivotally connected with the sides of the section as at 42 to fold and unfold with respect thereto and are preferably constructed of the same material as the ends 1 of the main frame so that when folded they will form a portion of the framework. In order to automatically swing these legs about their pivots into and out of operative positions by the opening and closing movements of the sections 9—10—11, and to hold the legs against swinging movement when the structure is closed, links 43 are provided, coöperating with the legs 41 to hold the back section 11 in position when the parts are closed, as shown in Fig. 5.

One end of the links 43 is pivotally connected with the respective legs 41 as at 44 and the other ends are pivotally connected as at 45 to arms or members 46 which are secured to the ends of the section 10 to project beyond the pivots 36 and in a direction toward the rear of the main frame when the parts are in closed positions (see Fig. 5). The pivot 36 also forms a fastening means for the members 46 and is spaced from the pivot 45. Thus it will be seen that during the folding and closing movements of the sections the arms or members 46 will operate on the links 43 to adjust them in such a manner as to move the legs 41 about their pivots 42.

The back section 11 is provided with blocks 47 filling the space above the legs when folded back and giving a finished appearance to the structure. These blocks have no function and may be omitted if desired.

Obviously, the main frame is of such a size that when the parts are in folded positions they will all coöperate to form a neat and compact structure and the seat 31 will be at the proper elevation for comfort. In order to close the space at the front of the folded structure, which is formed between the edge of the seat 31 and the upper edge of the foot board or member 8 (see Figs. 2 and 5), there is provided a flexible closure 48 which yields during the folding and unfolding operation. The sections when unfolded are adapted to assume such positions with respect to each other that their upper surfaces will be in substantially the same horizontal plane, and a yielding or elastic support for the mattress (not shown) is provided on these surfaces. This support may be in the form of any elastic surface well known in this art. In the present invention, however, the elastic support is of sectional structure flexibly connected together, one section for each of the sections 9—10—11, (and designated generally by the references 49—50—51, in Fig. 1) the sections being secured to the respective main sections 9—10—11 in any suitable manner so as to fold and unfold therewith and with respect to each other. The section 50 of the elastic support also contains the springs 52 of the seat 31, and this section is of a stronger construction than the remaining sections for the reason that it is located at the point most needed, that is, at the point where the greatest weight of the body is to be borne when one is lying thereon.

In order to strengthen the upholstering 38 at the edge adjacent the section 10, and at the same time permit it to yield under the weight of the body when the sections are in open position, yielding reinforcing means is provided which will now be described, reference being had more particularly to Figs. 11 to 14.

As before stated, the section 11 is of frame-like structure and arranged to extend across one edge thereof, the edge adjacent the section 10, and from opposite ends of the section, are yieldable bars or members 53 the inner ends of which do not meet but are connected to each other by an elastic member 54, such as a coil spring or the like, which normally exerts its tension upon the members 53 to hold them taut when the parts are folded, as shown in Fig. 5, and as they are embedded in the upholstering 38 adjacent the edge, the latter will also be held taut, but will yield when the sections are unfolded and weight or strain is applied thereto (see Fig. 13). Additional supports or braces 55 are preferably provided connecting the ends of the front bar 53 with the back bar. The purpose of these braces being to prevent the front bars from being forced back at any time when pressure is brought to bear upon them.

In Fig. 12 the additional yielding bars 56 are connected with a fixed support at one end and have a loose connection, such as a pin and slot 57—58, with the members 53, and an elastic member such as a coil spring 59 is disposed between and connected with the respective members 53—56 and coöperate with the elastic member 54.

In the form shown in Fig. 14 there is provided members 60 similar to the members 53 and which are connected at their spaced adjacent ends by the elastic member or spring 61 similar to the elastic member 54. The inner ends of these members 60 are slotted as at 62 to receive pins 63 carried by one end of link members 64, the free ends of which members are pivotally connected preferably by a common pivot 65 with one end of a member 66 similar to the members 55, the other end of which member 66 is connected with the back of the frame opposite the front member 60. This construction serves the same purpose as that illustrated in Fig. 11 and prevents the front of the frame from being forced back when pressure is brought to bear on the surface.

The mattress (not shown) assumes a flat posi on upon the upper face of the sections 9—10—11 when the latter are unfolded and is fastened thereto against accidental displacement in a manner well known in this art, so that when the sections 9—10—11 are opened and closed the mattress will be correspondingly opened or unfolded with the sections to an exposed or concealed position without interfering with the free and easy folding and unfolding movements of the structure.

Briefly stated, the operation is as follows: Assuming the parts to be open, as shown in Figs. 1 and 2, and with the mattress removed, the upholstering on the back and seat sections will be on the under side of the respective sections. To close, the operator raises the outer edge of the section 11 which will cause the intermediate section to turn on its pivot 20. The movement of this section will also move the part 13 of the end section 9 about the pivot 20 instead of 36, inasmuch as the flange 29, of the part 13, overlaps the edge of the section 10. This movement of the part 13 about the pivot 20 will draw or pull upon the part 12 of section 9 causing the part 12 to move about the pivot 17 and the link 15 to move about the pivot 16, thereby causing the parts 12—13 and 15 to move around to the respective positions shown in Fig. 4. At the same time the relative movement of the parts 13 and 10 will create a tension on the elastic members 27 which tension operates to take up the load and to assist the operator in closing the structure. At the same time the operator by holding the outermost or back section 11 will cause a relative movement of the sections 10—11 about the pivots 36 which relative movement will cause the links 43 to swing the legs 41 about their pivots 42 into the position shown in Fig. 4 until the legs are arrested in their pivotal movement. A still further movement of the intermediate section 10 about the pivot 20 will cause the parts to assume the positions shown in Fig. 5, and a further tension will be exerted upon the elastic members 27 which tension tends normally to open the sections, but it is not of sufficient tension to overcome the weight of the parts when folded, but operates to assist the operator when opening the structure by relieving him of a greater portion of the weight of the parts. When closed the flexible member 48 (see Fig. 5) will be held taut and the seat and back upholstering 31—38 will be exposed and assume proper positions with relation to each other.

In order to hold or support the intermediate section 10 when the parts are closed, suitable brackets or clips 67 may be pivoted upon which the section 10 rests, and are themselves mounted upon any suitable fixed support, such as the ends 1 of the stationary or main frame.

Obviously numerous changes may be made in the details of construction and arrangement of the various parts without departing from the spirit or scope of this invention. It is also obvious that the structure may be reinforced and braced in any suitable manner and at any point therein, where necessary or advisable.

I claim:

1. In an article of the class described having a frame and a plurality of sections, and means for supporting said sections, one of said sections on said frame comprising a supporting frame for upholstery or the like, said frame having means whereby to resist distortion along one plane but permit it in a direction at right angles thereto.

2. In a sofa bed, the combination with a frame, a main section, a seat section, a back section, said sections being pivotally secured together in such a way as to open into a horizontal alinement forming a bed surface; means mounted within said back section to permit vertical movement thereof and to resist horizontal movement when the section is used as a bed, said means comprising a back bar, a divided front bar, the members of which are spring connected and rearwardly extending members rigidly connected to the back bar.

3. As a new article of manufacture, a furniture frame section comprising a divided front bar, springs uniting the ends of said divisions, side bars, a rear bar, rearwardly extending bars connecting the inner ends of said divided bars with the section back of said front member.

4. In a sofa bed, the combination with a frame, a main section, a seat section, a back section, said sections being pivotally secured together to open into a horizontal alinement, and means for easing the lowering of said main section when the bed is being closed, said means comprising a spring member, one end of which is secured to said seat section and the other end to the main section.

In witness whereof, I have hereunto subscribed my name in the presence of two witnesses.

CHARLES J. KINDEL.

Witnesses:
F. H. DRURY,
MABEL REYNOLDS.